US012581403B2

(12) United States Patent
Wang et al.

(10) Patent No.:  US 12,581,403 B2
(45) Date of Patent:       Mar. 17, 2026

(54) DATA PROCESSING METHOD AND MIRROR SERVER FOR LOW-POWER WIRELESS PERSONAL AREA NETWORK SYSTEM

(71) Applicant: WISTRON NEWEB CORPORATION, Hsinchu (TW)

(72) Inventors: Jing-Ling Wang, Hsinchu (TW); Yu-Chieh Huang, Hsinchu (TW); Chien-Yu Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 630 days.

(21) Appl. No.: 18/052,951

(22) Filed: Nov. 7, 2022

(65) Prior Publication Data

US 2023/0403645 A1    Dec. 14, 2023

(30) Foreign Application Priority Data

Jun. 8, 2022    (TW) .................................. 111121150

(51) Int. Cl.
H04W 52/02        (2009.01)
(52) U.S. Cl.
CPC .............................. H04W 52/0206 (2013.01)
(58) Field of Classification Search
CPC .............................................. H04W 52/0206
See application file for complete search history.

(56) References Cited

U.S. PATENT DOCUMENTS

| | | | | |
|---|---|---|---|---|
| 2016/0072800 A1* | 3/2016 | Soon-Shiong | ........ | H04L 9/0872 |
| | | | | 726/7 |
| 2022/0050623 A1* | 2/2022 | Murphy | ................ | G06F 3/0655 |
| 2023/0281042 A1* | 9/2023 | Khinvasara | .............. | G06N 5/04 |
| | | | | 718/104 |

FOREIGN PATENT DOCUMENTS

TW            201441808        * 11/2014

* cited by examiner

*Primary Examiner* — Golam Sorowar
*Assistant Examiner* — Nicole M Louis-Fils
(74) *Attorney, Agent, or Firm* — McClure, Qualey & Rodack, LLP

(57)                ABSTRACT

A data processing method for a low-power wireless personal area network (WPAN) system and a mirror server are provided. The low-power WPAN system includes an electronic device, and the data processing method includes: receiving sensing data at time intervals, and in response to determining that a last data record of the sensing data of a first time segment is received in a fault-tolerant time segment, triggering a rollover mechanism to move the sensing data stored in a memory block that is indexed as a (k+1)th time segment of kth previous unit time before the first time segment into a memory block that is indexed as a (k+2)th time segment of an (k+1) previous unit time before the first time segment, and move the sensing data stored in the memory block indexed as the first time segment into the memory block indexed as the second time segment.

12 Claims, 6 Drawing Sheets

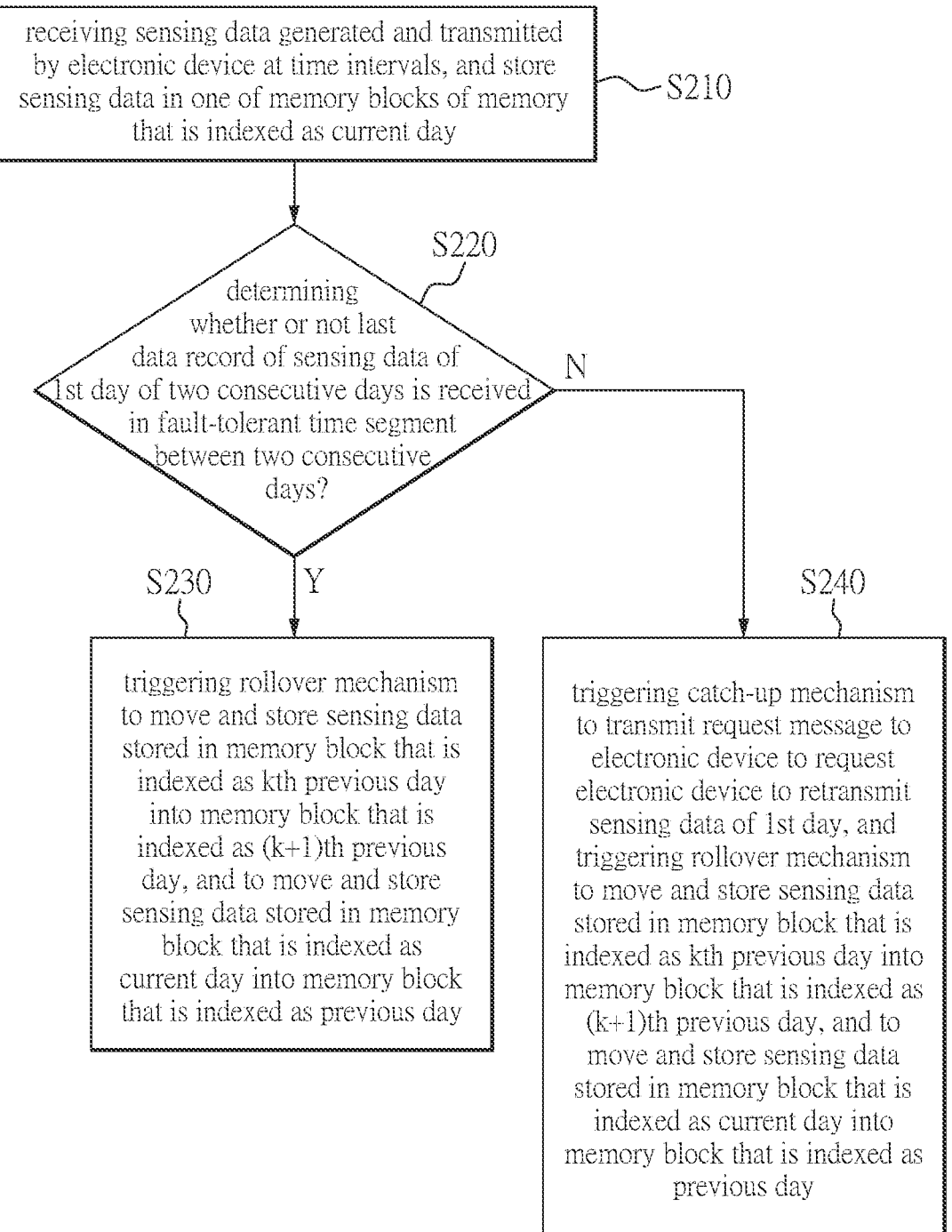

receiving sensing data generated and transmitted
by electronic device at time intervals, and store
sensing data in one of memory blocks of memory
that is indexed as current day ⟶ S210

S220 determining
whether or not last
data record of sensing data of
1st day of two consecutive days is received
in fault-tolerant time segment
between two consecutive
days?

N

Y

S230 triggering rollover mechanism
to move and store sensing data
stored in memory block that is
indexed as kth previous day
into memory block that is
indexed as (k+1)th previous
day, and to move and store
sensing data stored in memory
block that is indexed as
current day into memory block
that is indexed as previous day

S240 triggering catch-up mechanism
to transmit request message to
electronic device to request
electronic device to retransmit
sensing data of 1st day, and
triggering rollover mechanism
to move and store sensing data
stored in memory block that is
indexed as kth previous day into
memory block that is indexed as
(k+1)th previous day, and to
move and store sensing data
stored in memory block that is
indexed as current day into
memory block that is indexed as
previous day

FIG. 2

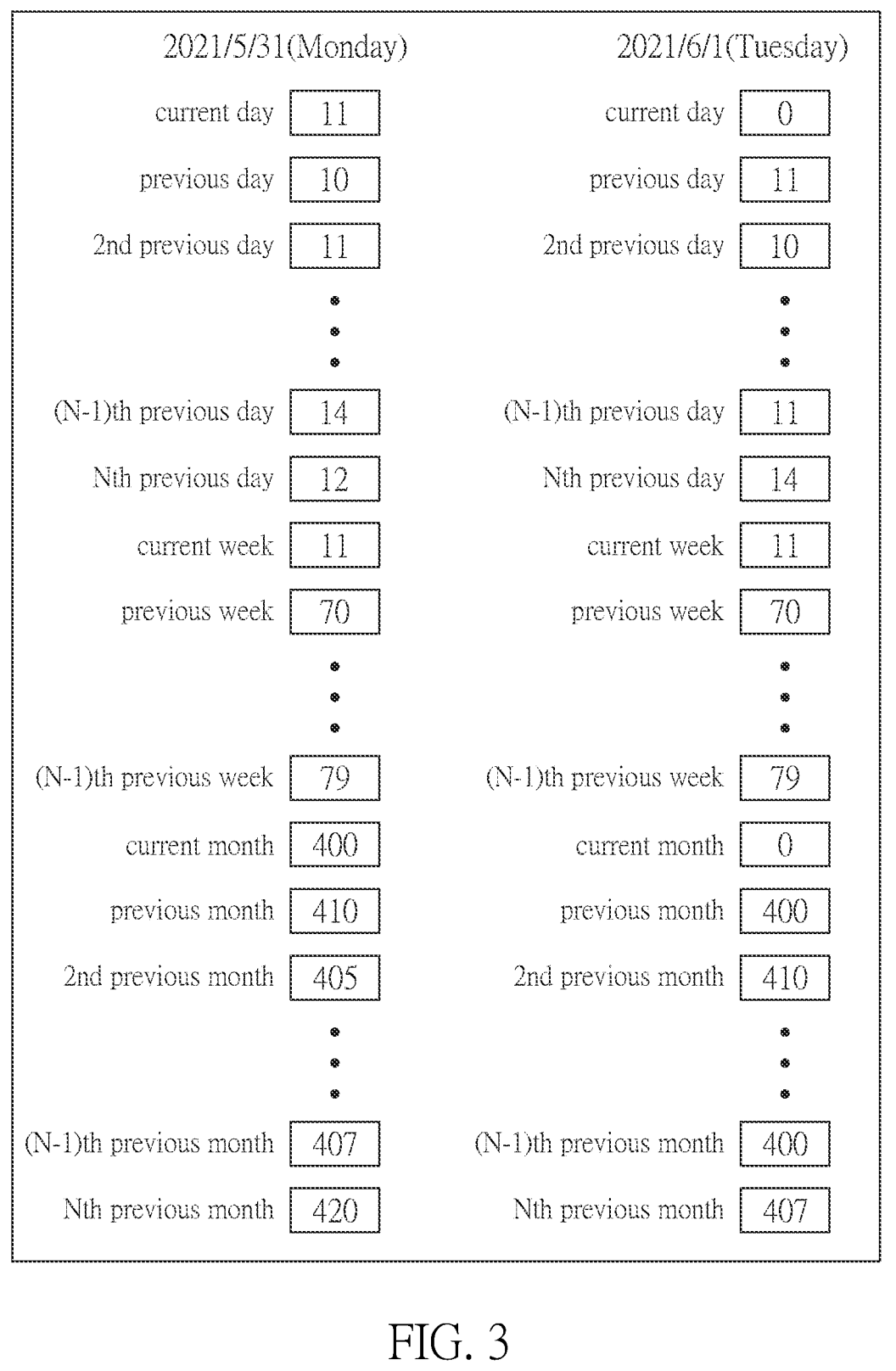

| 2021/5/31(Monday) | | 2021/6/1(Tuesday) | |
|---|---|---|---|
| current day | 11 | current day | 0 |
| previous day | 10 | previous day | 11 |
| 2nd previous day | 11 | 2nd previous day | 10 |
| ⁂⁂⁂ | | ⁂⁂⁂ | |
| (N-1)th previous day | 14 | (N-1)th previous day | 11 |
| Nth previous day | 12 | Nth previous day | 14 |
| current week | 11 | current week | 11 |
| previous week | 70 | previous week | 70 |
| ⁂⁂⁂ | | ⁂⁂⁂ | |
| (N-1)th previous week | 79 | (N-1)th previous week | 79 |
| current month | 400 | current month | 0 |
| previous month | 410 | previous month | 400 |
| 2nd previous month | 405 | 2nd previous month | 410 |
| ⁂⁂⁂ | | ⁂⁂⁂ | |
| (N-1)th previous month | 407 | (N-1)th previous month | 400 |
| Nth previous month | 420 | Nth previous month | 407 |

FIG. 3

DATA PROCESSING METHOD AND MIRROR SERVER FOR LOW-POWER WIRELESS PERSONAL AREA NETWORK SYSTEM

CROSS-REFERENCE TO RELATED PATENT APPLICATION

This application claims the benefit of priority to Taiwan Patent Application No. 111121150, filed on Jun. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a data processing method, and more particularly to a data processing method and a mirror server for a low-power wireless personal area network (WPAN) system.

BACKGROUND OF THE DISCLOSURE

The low-power wireless personal area network (WPAN) system can include at least one electronic device for generating sensing data relating to, e.g., temperature, humidity, air quality, soil quality or gas usage. In addition, since users may wish to obtain historical sensing data of the electronic device, storage and processing of the historical sensing data of the electronic device has become an important issue in the related art. Generally, the electronic device of the low-power WPAN system is a battery powered device, and users are likely to expect that the electronic device can operate for more than 10 years without requiring battery replacement. However, data transmission consumes power, and more power will be consumed if more pieces of sensing data are transmitted by the electronic device for the historical sensing data, which increases power consumption of the electronic device and reduces a battery life.

SUMMARY OF THE DISCLOSURE

In response to the above-referenced technical inadequacies, the present disclosure provides a data processing data for a low-power wireless personal area network (WPAN) system.

In one aspect, the present disclosure provides a data processing method for a low-power WPAN system, the low-power WPAN system including an electronic device and a mirror server that are communicatively connected to each other, the mirror server including a memory, and the data processing method comprising: configuring the mirror server to: receive sensing data generated and transmitted by the electronic device at time intervals, and store the sensing data in one of a plurality of memory blocks of the memory, in which the one of the plurality of memory blocks is indexed as a first time segment, the plurality of memory blocks further includes N memory blocks that are indexed from a second time segment of a previous unit time before the first time segment to an (N+1)th time segment of an Nth previous unit time before the first time segment, N is an integer greater than 1, and the electronic device generates, according to the time intervals, a last data record of the sensing data of the first time segment at a specific time; determine whether or not the last data record of the sensing data of the first time segment is received in a fault-tolerant time segment between the first time segment and a next time segment; and in response to determining that the last data record of the sensing data of the first time segment is received in the fault-tolerant time segment, trigger a rollover mechanism to: move and store the sensing data stored in a memory block that is indexed as a (k+1)th time segment of a kth previous unit time before the first time segment of the plurality of memory blocks into a memory block that is indexed as a (k+2)th time segment of a (k+1)th previous unit time before the first time segment of the plurality of memory; and move and store the sensing data stored in the memory block that is indexed as the first time segment into the memory block that is indexed as the second time segment, where k is an integer from N−1 to 1.

In another aspect, the present disclosure provides a mirror server for a low-power WPAN system. The low-power WPAN further includes an electronic device, and the mirror server includes a memory, a communication circuit and a processing circuit. The memory includes a plurality of memory blocks. The communication circuit is communicatively connected to the electronic equipment, and is configured to receive sensing data generated and transmitted by the electronic device at time intervals, and store the sensing data in one of a plurality of memory blocks of the memory. The plurality of memory blocks further include N memory blocks that are indexed from a second time segment of previous unit time before the first time segment to an (N+1)th time segment of an Nth previous unit time before the first time segment, N is an integer greater than 1, and the electronic device generates, according to the time intervals, a last data record of the sensing data of the first time segment at a specific time. The processing circuit is configured to: determine whether or not the last data record of the sensing data of the first time segment is received in a fault-tolerant time segment between the first time segment and a next time segment; and in response to determining that the last data record of the sensing data of the first time segment is received in the fault-tolerant time segment, trigger a rollover mechanism to: move and store the sensing data stored in a memory block that is indexed as a (k+1)th time segment of kth previous unit time before the first time segment of the plurality of memory blocks into a memory block that is indexed as a (k+2)th time segment of an (k+1) previous unit time before the first time segment of the plurality of memory; and move and store the sensing data stored in the memory block that is indexed as the first time segment into the memory block that is indexed as the second time segment, where k is an integer from N−1 to 1.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 2 is a flowchart of a data processing method according to one embodiment of the present disclosure;

FIG. 3 is a schematic diagram showing a memory block under a rollover mechanism that is triggered by a mirror server according to one embodiment of the present disclosure;

DETAILED DESCRIPTION OF THE EXEMPLARY EMBODIMENTS

Figure 1:
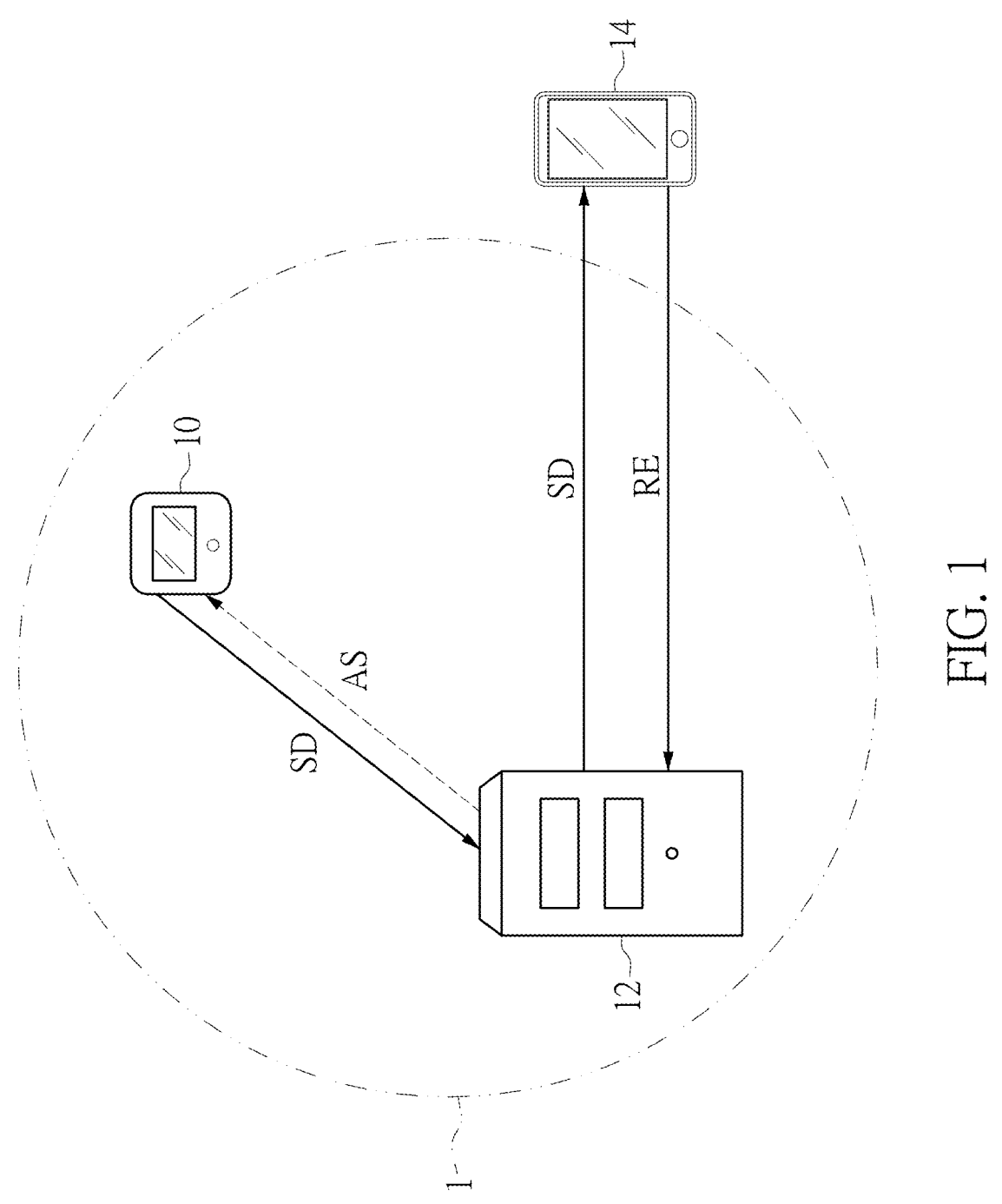
FIG. 1 is a schematic diagram of a low-power wireless personal area network system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made FIG. 1, which is a schematic diagram of a low-power wireless personal area network system according to one embodiment of the present disclosure. As shown in FIG. 1, a low-power wireless personal area network (WPAN) system 1 includes an electronic device 10. It should be noted that only one electronic device is used in this embodiment for ease of description, but the present disclosure does not limit a quantity of electronic devices in the low-power WPAN system 1. In other embodiments, the low-power WPAN system 1 can also include a plurality of electronic devices. In addition, the electronic device 10 of this embodiment can be a battery-powered or solar-powered electronic device, such as a gas meter, which may include a gas flow sensor and a network communication module for generating sensing data SD that records gas usage, but the present disclosure is not limited thereto.

Specifically, the electronic device 10 is configured to generate sensing data SD at time intervals, and according to each of the time intervals, the electronic device 10 generates the last data record of the sensing data SD of each day at 12:00 midnight of each day. For example, given that each of the interval time is 4 hours, the electronic device 10 can generate first to fifth data records of the sensing data SD of one day at 4 o'clock in the morning, 8 o'clock in the morning, 12 o'clock in the afternoon, 4 o'clock in the afternoon and 8 o'clock in the afternoon, respectively, and can generate the last data record (i.e., a sixth data record) of the sensing data SD of the day at 12:00 midnight of the day. However, data transmission consumes power, and more power will be consumed if the electronic device 10 transmits more data records of the sensing data SD for historical sensing data that a user device 14 wishes to obtain, which increases power consumption of the electronic device 10 and reduces a battery life thereof.

In order to address the above issues, the present disclosure provides a mirror server 12 in the low-power WPAN system 1 to collect and store the sensing data SD from the electronic device 10 (i.e., the low-power WPAN system 1 includes the electronic device 10 and the mirror server 12 that are communicatively connected to each other), and in response to receiving a request from the user device 14, the mirror server 12 can directly provide the sensing data SD stored therein to the user device 14, such that the user device 14 does not need to obtain the sensing data SD from the electronic device 10 again.

In other words, the mirror server 12 can assist in storing and processing the historical sensing data of the electronic device 10. Since the mirror server 12 can store and process the historical sensing data, the electronic device 10 only needs to periodically transmit the sensing data SD generated thereby to the mirror server 12, such that the electronic device 10 can save power required for transmitting a large quantity of data records.

More specifically, in the present disclosure, the electronic device 10 can be configured to transmit the sensing data SD to the mirror server 12 immediately after each data record of the sensing data SD is generated. In addition, in order to reduce power consumption, the electronic device 10 usually keeps the network communication module off, so that the user device 14 cannot obtain the sensing data SD from the electronic device 10 at any time. In contrast, since the mirror server 12 is powered by utility power, a communication circuit of the mirror server 12 can be kept in an ON state, such that the user device 14 can obtain the sensing data SD from the mirror server 12 at any time.

Moreover, the electronic device 10 transmits data in packets, and retrieval of historical sensing data is usually performed according to timestamps that serve as indices. However, to reduce power consumption of data transmission, in the present disclosure, packet payloads transmitted by the electronic device 10 can also be limited to include only content of the sensing data SD without time stamp that is recorded in response to the sensing data SD being generated. Therefore, in the present disclosure, a rollover mechanism is designed for the mirror server 12, such that the mirror server 12 can store and process the historical sensing data of the electronic device 10 without transmitting the time stamp through the electronic device 10. Reference is made to FIG. 2, which is a flowchart of a data processing method according to one embodiment of the present disclosure.

Specifically, the mirror server 12 includes a memory, and the data processing method includes configuring the mirror server 12 to perform steps of FIG. 2. Step S210: configuring the mirror server to receive sensing data SD generated and transmitted by the electronic device 10 at time intervals, and store the sensing data SD in one of a plurality of memory blocks of the memory that is indexed as a current day. The plurality of memory blocks can further include N memory blocks that are indexed as, from a previous day to an Nth previous day, and N is an integer greater than 1. It should be understood that the memory block that is indexed as the current day is used for storing the sensing data SD of the current day, and the memory block that is indexed as the previous day is used to store the sensing data SD of the previous day, and so forth, the memory block that is indexed as the Nth previous day is used for storing the sensing data SD of the Nth previous day.

However, at an end of the current day, the sensing data SD of an (N−1)th previous day becomes the sensing data SD of the Nth previous day, and so forth, the sensing data SD of the previous day becomes the sensing data SD of a second previous day, and the sensing data SD of the current day becomes the sensing data SD of the previous day. Therefore, the mirror server 12 can trigger the rollover mechanism to move and store the sensing data SD of the (N−1)th previous day from a memory block that is indexed as the (N−1)th previous day into a memory block that is indexed as the Nth previous day, such that the sensing data SD of the (N−1)th previous day becomes the sensing data SD of the Nth previous day, and so forth, the sensing data SD of the previous day is moved and stored from a memory block that is indexed as the previous day into a memory block that is indexed as the second previous day, such that the sensing data SD of the previous day becomes the sensing data SD of the second previous day, and the sensing data SD of the current day is moved and stored from a memory block that is indexed as the current day into the memory block that is indexed as the previous day, such that the sensing data SD of the current day becomes the sensing data SD of the previous day.

In addition, although the electronic device 10 is configured to transmit the last data record of the sensing data SD of the current day to the mirror server 12 at 12:00 midnight of the current day, there may be a transmission delay or time deviation between the mirror server 12 and the electronic device 10 (that is, clock time of the mirror server 12 may be faster or slower than clock time of the electronic device 102), such that the mirror server 12 may receive the last data record of the sensing data SD of the current day earlier or later. Therefore, in the present disclosure, a fault-tolerant time segment is defined between two consecutive days. A time length of the fault-tolerant time segment is smaller than a length each of the time intervals, and may preferably be 2% of each of the time intervals, but the present disclosure is not limited thereto. For example, given that the time length of the fault-tolerant time segment is 10 minutes, it can be known that the fault-tolerant time segment between two consecutive days is 11:55 pm on the first day of the two consecutive days to 12:05 am on the second day of the two consecutive days, but the present disclosure is not limited thereto. It should be understood that the so-called first day refers to an earlier day of the two consecutive days.

In other words, if the mirror server 12 does not receive the last data record of the sensing data SD of the first day at 12:00 midnight on the first day of the two consecutive days, the mirror server 12 can wait for a period of time, and thus the mirror server 12 can also delay to trigger the rollover mechanism after this period of time. In addition, if the mirror server 12 receives the last data record of the sensing data SD of the first day in the fault-tolerant time segment between the first day and the second day, the mirror server 12 can firstly determine that the first day ends, and directly trigger the rollover mechanism. Since packet losses may inevitably occur during data transmissions in wireless network, in the present disclosure, a catch-up mechanism is further designed for the mirror server 12 to ensure that a data consistency between the mirror server 12 and the electronic device 10 can be maintained. That is, if the mirror server 12 does not receive the last data record of the sensing data SD of the first day within the fault-tolerant time segment, the mirror server 12 can not only trigger the rollover mechanism, but also trigger a catch-up mechanism to request the electronic device 10 to retransmit the sensing data SD of the first day.

Therefore, the data processing method proceeds to step S220 to configure the mirror server 12 to: determine whether or not the last data record of the sensing data SD of a first day of the two consecutive days is received in a fault-tolerant time segment between the two consecutive days. If the determination is affirmative, the data processing method proceeds to step S230: configuring the mirror server 12 to trigger a rollover mechanism to move and store the sensing data SD stored in a memory block that is indexed as a kth previous day into a memory block that is indexed as a (k+1)th previous day, and to move and store the sensing data SD stored in the memory block that is indexed as the current day into the memory block that is indexed as the previous day. If the determination is negative, the data processing method proceeds to step S240: configuring the mirror server 12 to trigger a catch-up mechanism to transmit a request message AS to the electronic device 10 to request the electronic device 10 to retransmit the sensing data SD of the first day, and to trigger the rollover mechanism to move and store the sensing data SD stored in the memory block that is indexed as the kth previous day into the memory block that is indexed as the (k+1)th previous day, and to move and store the sensing data SD stored in the memory block that is indexed as the current day into the memory block that is indexed as the previous day. It should be understood that k is an integer from N−1 to 1.

Reference is made to FIG. 3, which is a schematic diagram showing a memory block under a rollover mechanism that is triggered by a mirror server according to one embodiment of the present disclosure. For the convenience of the following description, in the embodiment of FIG. 3, it can be assumed that the memory block indexed as the current day only stores one data record of the sensing data SD recording gas usage of the current day, and the memory block indexed as a previous day only stores one data record of the sensing data SD recording gas usage of the previous day, and so forth, the memory block indexed as Nth previous day only stores one data record of the sensing data SD recording the gas usage of the Nth previous day. As shown in FIG. 3, under a circumstances that May 31, 2021 is a first day of the two consecutive days, when the mirror server 12 triggers the rollover mechanism, gas usage 14 stored in the memory block indexed as an (N−1)th previous day can be moved and stored into the memory block indexed as an Nth previous day, and so forth, gas usage 10 stored in the memory block indexed as a previous day can be moved and stored into the memory block indexed as a second previous day, then gas usage 11 of May 31, 2021 can be moved from the memory block indexed as the current day to the memory block indexed as the previous day, and the memory block indexed as the current day can be used to store the sensing data SD of Jun. 1, 2021.

In addition, the plurality of memory blocks of the mirror server 12 can further include a plurality of memory blocks indexed as a current week, previous week to an Nth previous week, a current month, and previous month to an Nth previous month. Therefore, when the mirror server 12 triggers the rollover mechanism, according to day of the week and day of the current month that the first day of the two consecutive days is, the mirror server 12 can also update data records stored in memory blocks that are indexed as the current week, the previous week to the Nth previous week, the current month, and the previous month to the Nth previous month.

For example, in the embodiment of FIG. 3, it can be assumed that the memory block indexed as the current week only stores one data record of gas usage of the current week, the memory block indexed as the previous week only stores one data record of gas usage of the previous week, and so forth, the memory block indexed as the Nth previous week only stores one data record of gas usage of the Nth previous week. Therefore, as shown in FIG. 3, when the mirror server 12 triggers the rollover mechanism, since May 31, 2021 is the Monday of the week, the mirror server 12 can store the gas usage 11 of May 31 in the memory block that is indexed as the current week, and holds data stored in the N memory blocks that are indexed as the previous week to the Nth previous week.

Similarly, in the embodiment of FIG. 3, it can be assumed that the memory block indexed as the current month only stores gas usage of the current month, the memory block indexed as the previous month only stores gas usage of the previous month, and so forth, the memory block indexed as the Nth previous month only stores gas usage of the Nth previous month.

Therefore, as shown in FIG. 3, when the mirror server 12 triggers the rollover mechanism, since May 31, 2021 is a last day of the month, the mirror server 12 can first add gas usage stored in the memory block that is indexed as the current month to the gas usage 11 on May 31 to obtain a new gas usage 400 of the current month, gas usage 407 stored in the memory block indexed as the (N−1)th previous month can be moved and stored into the memory block indexed as an Nth previous month, and so forth, move and store gas usage 410 stored in the memory block indexed as a previous month into the memory block indexed as a second previous month, then the new gas usage 400 of the current month can be moved and stored, from the memory block indexed as the current month, into the memory block indexed as the previous month.

It should be noted that each memory block in FIG. 3 stores only one data record of gas usage merely as an example, and is not intended to limit the present disclosure. In other embodiments, each memory block may further include a plurality of pages for storing a plurality of data records of the sensing data SD, respectively. For example, the memory block indexed as the current day can include a plurality of pages, which are respectively used to store first to sixth data records of the sensing data SD generated by the electronic device 10 at 4:00 AM, 8:00 AM, 12:00 AM, 4:00 PM, 8:00 PM and 12:00 PM on the current day.

Therefore, although the mirror server 12 receives the last data record of the sensing data SD of the first day of the two consecutive days within the fault-tolerant time segment between the two consecutive days, the mirror server 12 can also determine, by counting a quantity of data records of the sensing data SD of the first day, whether or not all data records of the sensing data SD of the first day are received. If the determination is negative, for example, only five data records of the sensing data SD of the first day are received, the mirror server 12 can further trigger the catch-up mechanism to transmit the request message AS to the electronic device 10 to request the electronic device 10 to retransmit the sensing data SD of the first day.

Specifically, the mirror server 12 can also collect statistics on the historical sensing data (e.g., the sensing data SD that is accumulated for one or more days) to obtain time points at which the electronic device 10 generates the sensing data on the first day. Therefore, the request message AS transmitted by the mirror server 12 can include start time information and end time information, and the mirror server 12 can determine the start time information and the end time information according to an earliest time and a latest time corresponding to a part of the sensing data that has not been received.

In other words, the data processing method can further include configuring the mirror server 12 to determine an earliest time and a latest time corresponding to a part of the sensing data of the first day that has not been received, and determine, according to the earliest time and the latest time, the start time information and the end time information included in the request message AS.

For example, by performing statistics on the historical sensing data, the mirror server 12 can learn that the electronic device 10 generates the sensing data SD at 4:00 AM, 8:00 AM, 12:00 AM, 4:00 PM, 8:00 PM and 12:00 PM on May 31, 2021. Therefore, if the mirroring server 12 determines that second and fifth data records of the sensing data SD generated by the electronic device 10 at 8:00 AM and 8:00 PM on May 31, 2021 are not received, the mirroring server 12 can determine the start time information and the end time information of the request message AS according to 8:00 AM and 8:00 PM on May 31, 2021, so as to request the electronic device 10 to retransmit the sensing data SD from 8:00 AM to 8:00 PM on May 31, 2021.

In this embodiment, the data processing method can further include configuring the mirror server 12 to, in response to receiving a read message RE transmitted by the user device 14, transmit the sensing data SD to the user device 14. In addition, the sensing data SD and the request message AS are transmitted between the electronic device 10 and the mirror server 12 based on a first communication protocol with low power consumption characteristics (e.g., ZigBee), and the sensing data SD and the reading message RE are transmitted between the mirror server 12 and the user device 14 based on a second communication protocol that is an Internet protocol (e.g., WI-FI).

Therefore, the user device 14 can obtain the sensing data SD of the electronic device 10 from the mirror server 12 through the Internet protocol, regardless of whether or not the user device 14 is located in the low-power WPAN system 1. In addition, in a case where the first communication protocol is ZigBee, the start time information and the end time information of the request message AS can be recorded in a command payload of a ZigBee cluster library (ZCL) frame, and are both represented by 4 Bytes, but the present disclosure is not limited thereto.

Figure 4:
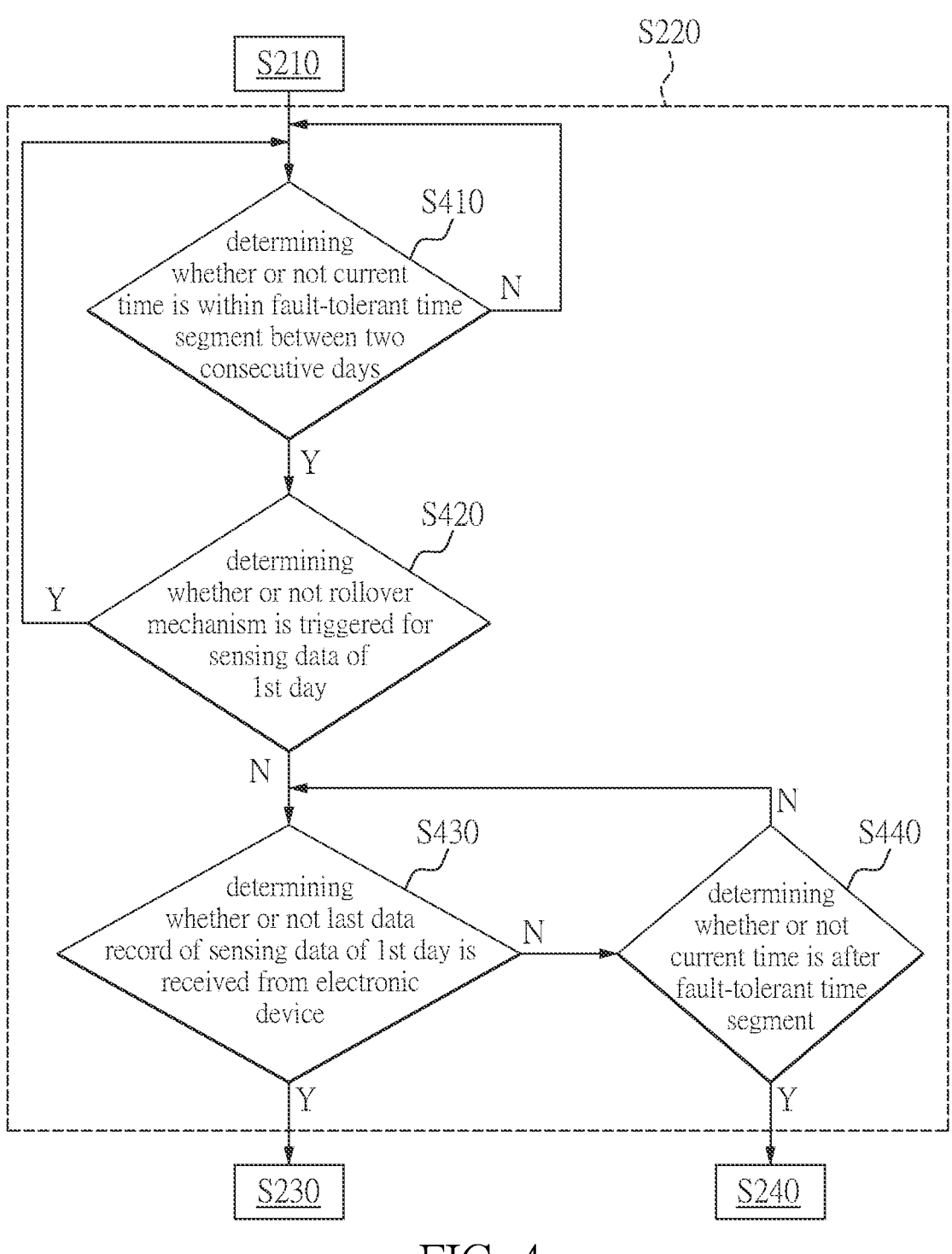
FIG. 4 is a flowchart for determining whether or not the mirror server receives a last data record of sensing data of a first day within the fault-tolerant time segment according to one embodiment of the present disclosure.

Furthermore, reference is made to FIG. 4, which is a flowchart for determining whether or not the mirror server receives a last data record of sensing data of a first day within the fault-tolerant time segment according to one embodiment of the present disclosure. As shown in FIG. 4, the data processing method proceeds to step S410: configuring the mirror server 12 to determine whether or not a current time is within a fault-tolerant time segment between two consecutive days (for example, from 11:55 PM on the first day of the two consecutive days to 12:05 AM on the second day). If the determination is affirmative, the data processing method proceeds to step S420; and if the determination is negative, the data processing method returns to step S410 until the current time is within the fault-tolerant time segment between the two consecutive days. Step S420: configuring the mirror server 12 to determine whether or not the rollover mechanism is triggered for the sensing data SD of the first day (e.g., May 31, 2021). If the determination is negative, the data processing method proceeds to step S430; if the determination is affirmative, the data processing method returns to step S410. It should be noted that the step S420 is designed to prevent the mirror server 12 from repeatedly triggering the rollover mechanism within the fault-tolerant time segment.

Specifically, since the electronic device 10 may repeatedly transmit the last data record of the sensing data SD of the first day by mistake, the mirror server 12 may also repeatedly receive the last data record of the sensing data SD of the first day within the fault-tolerant time segment. Therefore, in the present embodiment, the step S420 is designed to prevent the mirror server 12 from repeatedly triggering the rollover mechanism within the fault-tolerant time segment. Next, the data processing method proceeds to step S430: configuring the mirror server 12 to determine whether or not the last data record of the sensing data SD of the first day is received from the electronic device 10. If the determination is affirmative, the data processing method proceeds to step S230; if the determination is negative, the data processing method proceeds to step S440. Step S440: configuring the mirror server 12 to determine whether or not the current time is after the fault-tolerant time segment. If the determination is negative, the data processing method returns to step S430; if the determination is affirmative, the data processing method proceeds to step S240. It should be noted that the flowchart of FIG. 4 is only an example, and is not intended to limit the present disclosure.

On the other hand, although the electronic device 10 only needs to periodically transmit currently generated sensing data SD to the mirror server 12 to save a lot of power for data transmission, the electronic device 10 may still malfunction. Therefore, in the present disclosure, an inheritance mechanism is designed for the mirror server 12, such that the sensing data SD of the existing electronic device 10 can be transferred to another electronic device newly deployed on the low-power WPAN system 1.

Figure 5:
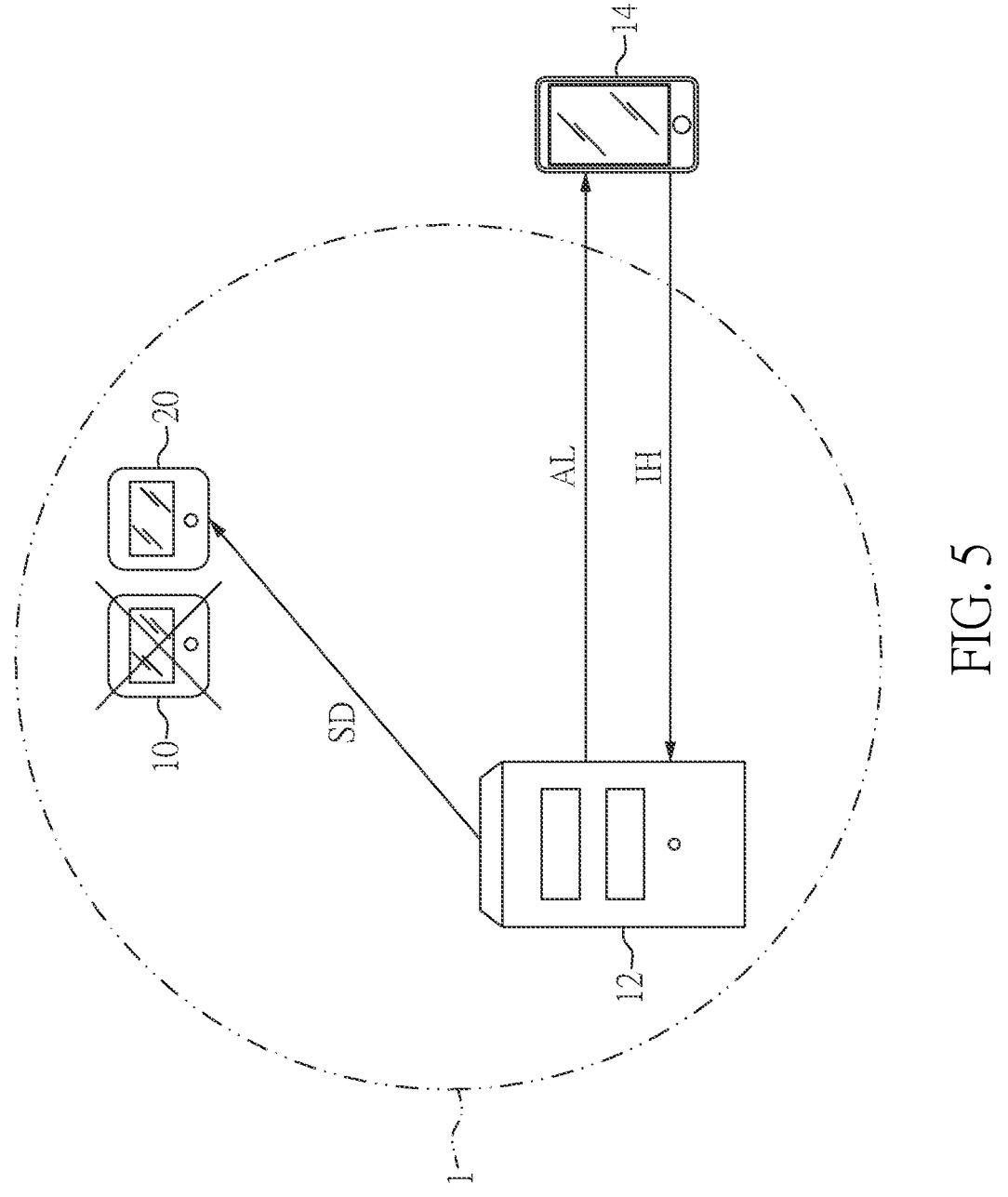
FIG. 5 is a schematic diagram showing the mirror server triggering an inheritance mechanism according to one embodiment of the present disclosure.

Reference is made to FIG. 5, which is a schematic diagram showing the mirror server triggering an inheritance mechanism according to one embodiment of the present disclosure. As shown in FIG. 5, the mirror server 12 can determine whether or not the electronic device 10 does not transmit the sensing data SD for more than a predetermined time (e.g., 2 days). If the determination is affirmative, the mirror server 12 can transmit an alarm message AL to the user device 14 to notify a user of the user device 14 that the electronic equipment 10 may have an abnormal condition. In response to receiving the alarm message AL transmitted by the mirror server 12, the user of the user device 14 can check and repair the electronic equipment 10 to eliminate the abnormal condition.

In other words, the data processing method can further include configuring the mirror server 12 to determine whether or not a time duration in which the electronic device 10 does not transmit the sensing data SD exceeds a predetermined time, and transmit, in response to determining that the time duration in which the electronic device 10 does not transmit the sensing data SD exceeds the predetermined time, the alarm message AL to the user device 14.

Then, if the electronic device 10 is determined to be malfunctioning after the checkup, the user of the user device 14 can replace the electronic device 10 with an electronic device 20, and after the electronic device 10 is replaced with the electronic device 20, the user device 14 can transmit an inheritance message IH to the mirror server 12. In response to receiving the inheritance message IH transmitted by the user device 14, the mirror server 12 can trigger the inheritance mechanism to transmit the sensing data SD that is stored in the electronic equipment 10 to the electronic equipment 20.

In other words, the data processing method can further includes configuring the mirror server 12 to trigger, in response to receiving the inheritance message IH transmitted by the user device 14, the inheritance mechanism to transmit the sensing data SD that is stored in the electronic equipment 10 to the electronic equipment 20. Therefore, through the inheritance mechanism, the electronic device 20 can inherit the sensing data SD obtained by the electronic device 10, and continue to generate and transmit the sensing data SD to the mirror server 12 at the time intervals, and loss of the historical sensing data due to the failure of the electronic device 10 can be avoided.

Figure 6:
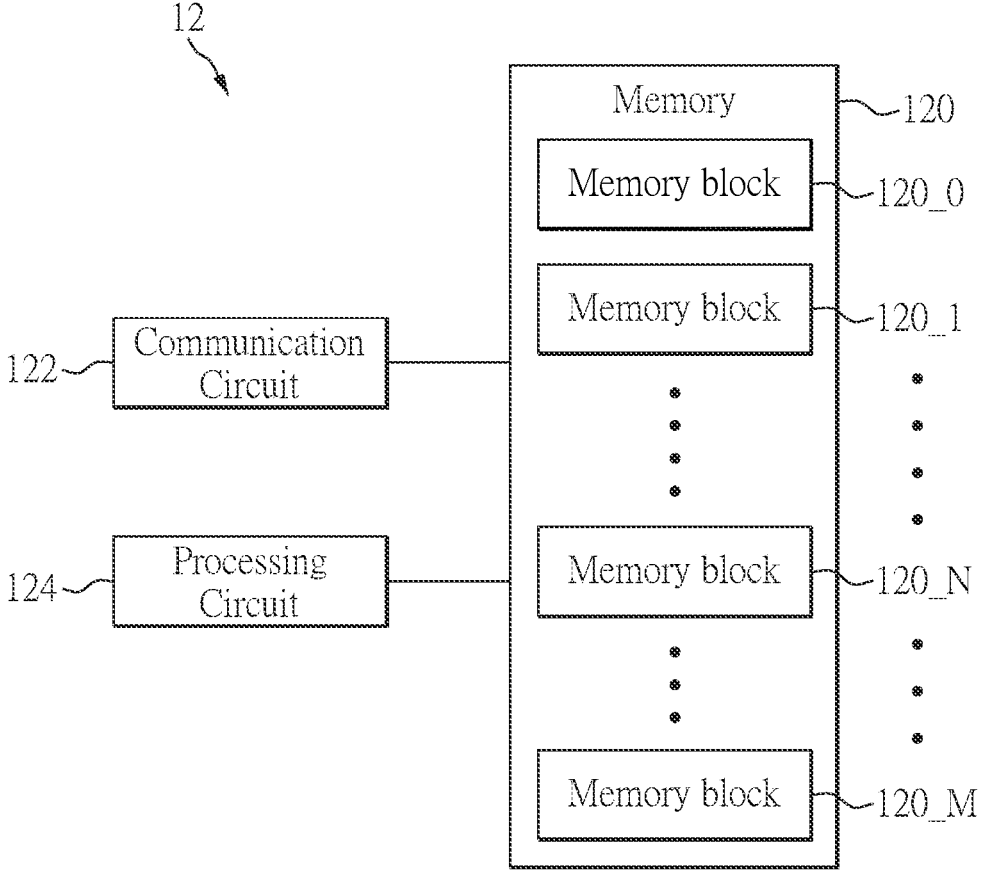
FIG. 6 is a functional block diagram of the mirror server according to one embodiment of the present disclosure.

Reference is made to FIG. 6, which is a functional block diagram of the mirror server according to one embodiment of the present disclosure. As shown in FIG. 6, the mirror server 12 includes a memory 120, a communication circuit 122 and a processing circuit 124. The memory 120 includes a plurality of memory blocks 120_0-120_M, where M is an integer greater than or equal to N. The communication circuit 122 and the processing circuit 124 can be implemented by hardware in combination with software and/or firmware, but the present disclosure does not limit specific implementations of the communication circuit 122 and the processing circuit 124.

In addition, the communication circuit 122 and the processing circuit 124 can be integrated or separately provided, but the present disclosure is not limited thereto. The communication circuit 122 is communicatively connected to the electronic device 10, and is configured to receive the sensing data SD generated and transmitted by the electronic device 10 at time intervals, and to store the sensing data SD in a memory block 120_0 of the memory blocks 120_0-120_M that is indexed as a current day. As mentioned above, the memory blocks 120_0-120_M can further include memory blocks 120_1-120_N that are indexed as a previous day to Nth previous day.

The processing circuit 124 is configured to determine whether or not the last data record of the sensing data SD of the first day of the two consecutive days in the fault-tolerant time segment between the two consecutive days (e.g., May 31, 2021 and Jun. 1, 2021), and in response to determining that the last data record of the sensing data SD of the first day is received within the fault-tolerant time segment, the processing circuit 124 can trigger the rollover mechanism to move and store the sensing data SD stored in the memory block 120_k that is indexed as the kth previous day into the memory block 120_k+1 that is indexed as the (k+1)th previous day, and to move and store the sensing data SD stored in the memory block 120_0 that is indexed as the current day into the memory block 120_1 that is indexed as the previous day.

In addition, in response to determining that the last data record of the sensing data SD of the first day is not received within the fault-tolerant time segment, the processing circuit 124 can trigger the catch-up mechanism to transmit the request message AS through the communication circuit 122 to the electronic device 10 to request the electronic device 10 to retransmit the sensing data SD of the first day, and to trigger the rollover mechanism to move and store the sensing data SD stored in the memory block 120_$k$ that is indexed as the kth previous day into the memory block 120_$k$+1 that is indexed as the (k+1)th previous day, and to move and store the sensing data SD stored in the memory block 120_0 that is indexed as the current day into the memory block 120_1 that is indexed as the previous day.

Further, in response to the communication circuit 122 receiving the read message RE transmitted by the user device 14, the processing circuit 124 can transmit the sensing data SD to the user device 14 through the communication circuit 122. In addition, the processing circuit 124 can further be configured to determine whether or not a time duration in which the electronic device 10 does not transmit the sensing data SD exceeds a predetermined time, and to transmit, in response to determining that the time duration in which the electronic device 10 does not transmit the sensing data SD exceeds the predetermined time, the alarm message AL to the user device 14. Then, in response to receiving the inheritance message IH transmitted by the user device 14, the processing circuit 124 can trigger the inheritance mechanism to transmit the sensing data SD that is stored in the electronic equipment 10 to another electronic equipment through the communication circuit 122. Since operation-related details of the mirror server 12 are the same as those described in the foregoing embodiments, repeated descriptions are omitted hereinafter.

It should be noted that, the above-mentioned storage manner of the sensing data SD of the electronic device 10 is not limited to take day as a unit time. In other words, the current day to the Nth previous day described in the present disclosure can be replaced by periodic time segments, and the present disclosure does not limit a time length of each of the periodic time segments. Therefore, in other embodiments, the memory block 120_0 can be indexed as a first time segment, and the memory block 120_1 can be indexed as a second time segment of a previous unit time before the first time segment, and so forth, the memory block 120_N can be indexed as an N+1th time segment of an Nth previous unit time before the first time segment. Similarly, 12:00 midnight described in the present disclosure can be changed to a specific time, that is, the electronic device 10 generates the last data record of the sensing data SD of the first time segment at the specific time.

In other words, in other embodiments, the communication circuit 122 can receive the sensing data SD generated and transmitted by the electronic device 10 at the time intervals, and store the sensing data SD in the memory block 120_0 that is indexed as the first time segment. The processing circuit 124 can determine whether or not the last data record the sensing data SD of the first time segment is received in the fault-tolerant time segment between the first time segment and a next time segment. In response to determining that the last data record of the sensing data SD of the first time segment is received in the fault-tolerant time segment, the processing circuit 124 can trigger the rollover mechanism to move and store the sensing data SD stored in the memory block 120_$k$ that is indexed as the (k+1)th time segment of the kth previous unit time before the first time segment of the plurality of memory blocks into a memory block 120_$k$+1 that is indexed as a (k+2)th time segment of an (k+1) previous unit time before the first time segment of the plurality of memory and can move and store the sensing data SD stored in the memory block 120_0 that is indexed as the first time segment into the memory block 120_1 that is indexed as the second time segment.

In addition, in response to determining that the last data record of the sensing data SD of the first day is not received within the fault-tolerant time segment, the processing circuit 124 can trigger the catch-up mechanism to transmit the request message AS through the communication circuit 122 to the electronic device 10 to request the electronic device 10 to retransmit the sensing data SD of the first time segment, and to trigger the rollover mechanism to move and store the sensing data SD stored in the memory block 120_$k$ that is indexed as the (k+1)th time segment of the kth previous unit time before the first time segment into the memory block 120_$k$+1 that is indexed as the (k+2)th time segment of the (k+1)th previous unit time before the first time segment, and to move and store the sensing data SD stored in the memory block 120_0 that is indexed as the first time segment into the memory block 120_1 that is indexed as the second time segment.

It can be seen that, each step in FIG. 2 and FIG. 4 can be modified based on the above changes without departing from the concept of the present disclosure. Specifically, in step S210, the communication circuit can receive the sensing data SD generated and transmitted by the electronic device at time intervals, and store the sensing data in the memory block that is indexed as the first time segment. Further, step S220 can be modified to determine whether or not the last data record of the sensing data of the first time segment is received in the fault-tolerant time segment between the first time segment and the next time segment.

In addition, step S230 can be modified to trigger the rollover mechanism to move and store the sensing data stored in the memory block that is indexed as the (k+1)th time segment of the kth previous unit time before the first time segment of the plurality of memory blocks into a memory block that is indexed as a (k+2)th time segment of an (k+1) previous unit time before the first time segment of the plurality of memory and can move and store the sensing data stored in the memory block that is indexed as the first time segment into the memory block that is indexed as the second time segment. Correspondingly, step S240 can be modified to trigger the catch-up mechanism to transmit the request message to the electronic device, so as to request the electronic device to retransmit the sensing data of the first time segment, and trigger the rollover mechanism to move and store the sensing data stored in the memory block that is indexed as the (k+1)th time segment of the kth previous unit time before the first time segment of the plurality of memory blocks into a memory block that is indexed as a (k+2)th time segment of an (k+1) previous unit time before the first time segment of the plurality of memory and can move and store the sensing data stored in the memory block that is indexed as the first time segment into the memory block that is indexed as the second time segment.

Further, step S410 can be modified to determine whether the current time is in the fault-tolerant time segment between the first time segment and the next time segment. Further, step S420 can be modified to determine whether or not the rollover mechanism is triggered for the sensing data of the first time segment. Next, step S430 can be modified to determine whether or not the last data record of the sensing data of the first time segment is received from the electronic device. Since relevant details are the same as the above-mentioned embodiments, repeated descriptions are omitted herein.

In conclusion, in the data processing method and the mirror server for the low-power WPAN system provided by the present disclosure, the mirror server can be used to assist in data storage and data processing of historical sensing data of the electronic device. Therefore, the electronic device only needs to periodically transmit the sensing data generated thereby to the mirror server, such that the electronic device can save power required for transmitting a large quantity of data records.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A data processing method for a low-power wireless personal area network (WPAN) system, the low-power WPAN system including an electronic device and a mirror server that are communicatively connected to each other, the mirror server including a memory, and the data processing method comprising:

configuring the mirror server to:

receive sensing data generated and transmitted by the electronic device at time intervals, and store the sensing data in one of a plurality of memory blocks of the memory, wherein the one of the plurality of memory blocks is indexed as a first time segment, the plurality of memory blocks further include N memory blocks that are indexed from a second time segment of a previous unit time before the first time segment to an (N+1)th time segment of an Nth previous unit time before the first time segment, N is an integer greater than 1, and the electronic device generates, according to the time intervals, a last data record of the sensing data of the first time segment at a specific time;

determine whether or not the last data record of the sensing data of the first time segment is received in a fault-tolerant time segment between the first time segment and a next time segment; and in response to determining that the last data record of the sensing data of the first time segment is received in the fault-tolerant time segment, trigger a rollover mechanism to:

move and store the sensing data stored in a memory block that is indexed as a (k+1)th time segment of a kth previous unit time before the first time segment of the plurality of memory blocks into a memory block that is indexed as a (k+2)th time segment of a (k+1)th previous unit time before the first time segment of the plurality of memory; and move and store the sensing data stored in the memory block that is indexed as the first time segment into the memory block that is indexed as the second time segment, wherein k is an integer from N−1 to 1.

2. The data processing method according to claim 1, further comprising configuring the mirror server to:

in response to determining that the last data record of the sensing data of the first time segment is not received in the fault-tolerant time segment, trigger a catch-up mechanism to transmit a request message to the electronic device to request the electronic device to retransmit the sensing data of the first time segment, and trigger the rollover mechanism to:

move and store the sensing data stored in the memory block that is indexed as the (k+1)th time segment of the kth previous unit time before the first time segment of the plurality of memory blocks into the memory block that is indexed as the (k+2)th time segment of the (k+1)th previous unit time before the first time segment of the plurality of memory; and move and store the sensing data stored in the memory block that is indexed as the first time segment into the memory block that is indexed as the second time segment, wherein a time length of the fault-tolerant time segment is smaller than a length of each of the time intervals.

3. The data processing method according to claim 2, further comprising configuring the mirror server to:

transmit, in response to receiving a read message transmitted by a user device, the sensing data to the user device, wherein the sensing data and the request message are transmitted between the electronic device and the mirror server based on a first communication protocol, and the sensing data and the read message are transmitted between the mirror server and the user device based on a second communication protocol.

4. The data processing method according to claim 3, further comprising configuring the mirror server to:

determine an earliest time and a latest time corresponding to a part of the sensing data of the first time segment that has not been received, and determine, according to the earliest time and the latest time, start time information and end time information included in the request message.

5. The data processing method according to claim 4, further comprising configuring the mirror server to:

determine whether or not a time duration in which the electronic device does not transmit the sensing data exceeds a predetermined time; and transmit, in response to determining that the time duration in which the electronic device does not transmit the sensing data exceeds the predetermined time, an alarm message to the user device.

6. The data processing method according to claim 5, further comprising configuring the mirror server to:

trigger, in response to receiving an inheritance message transmitted by the user device, an inheritance mechanism to transmit the sensing data of the electronic equipment that is stored to another electronic equipment.

7. A mirror server for a low-power wireless personal area network (WPAN) system including an electronic device, the mirror server comprising:

a memory including a plurality of memory blocks;

a communication circuit communicatively connected to the electronic equipment, wherein the communication circuit is configured to receive sensing data generated and transmitted by the electronic device at time intervals, and store the sensing data in one of a plurality of memory blocks of the memory, wherein the one of the plurality of memory blocks is indexed as a first time segment, the plurality of memory blocks further includes N memory blocks that are indexed from a second time segment of a previous unit time before the first time segment to an (N+1)th time segment of an Nth previous unit time before the first time segment, Nis an integer greater than 1, and the electronic device generates, according to the time intervals, a last data record of the sensing data of the first time segment at a specific time; and a processing circuit configured to:

determine whether or not the last data record of the sensing data of the first time segment is received in a fault-tolerant time segment between the first time segment and a next time segment; and in response to determining that the last data record of the sensing data of the first time segment is received in the fault-tolerant time segment, trigger a rollover mechanism to:

move and store the sensing data stored in a memory block that is indexed as a (k+1)th time segment of a kth previous unit time before the first time segment of the plurality of memory blocks into a memory block that is indexed as a (k+2)th time segment of a (k+1)th previous unit time before the first time segment of the plurality of memory; and move and store the sensing data stored in the memory block that is indexed as the first time segment into the memory block that is indexed as the second time segment, wherein k is an integer from N−1 to 1.

8. The mirror server according to claim 7, wherein the processing circuit is configured to:

in response to determining that the last data record of the sensing data of the first time segment is not received in the fault-tolerant time segment, trigger a catch-up mechanism to transmit a request message to the electronic device to request the electronic device to retransmit the sensing data of the first time segment, and trigger the rollover mechanism to:

move and store the sensing data stored in the memory block that is indexed as the (k+1)th time segment of the kth previous unit time before the first time segment of the plurality of memory blocks into the memory block that is indexed as the (k+2)th time segment of the (k+1)th unit time before the first time segment of the plurality of memory; and move and store the sensing data stored in the memory block that is indexed as the first time segment into the memory block that is indexed as the second time segment, wherein a time length of the fault-tolerant time segment is smaller than a length of each of the time intervals.

9. The mirror server according to claim 8, wherein the mirror server is configured to: transmit, in response to the communication circuit receiving a read message transmitted by a user device, the sensing data to the user device; and wherein the sensing data and the request message are transmitted between the electronic device and the mirror server based on a first communication protocol, and the sensing data and the read message are transmitted between the mirror server and the user device based on a second communication protocol.

10. The mirror server according to claim 9, wherein the processing circuit is further configured to:

determine an earliest time and a latest time corresponding to a part of the sensing data of the first time segment that has not been received, and determine, according to the earliest time and the latest time, start time information and end time information included in the request message.

11. The mirror server according to claim 10, wherein the processing circuit is further configured to:

determine whether or not a time duration in which the electronic device does not transmit the sensing data exceeds a predetermined time; and transmit, in response to determining that the time duration in which the electronic device does not transmit the sensing data exceeds the predetermined time, an alarm message to the user device.

12. The mirror server according to claim 11, wherein the processing circuit is configured to trigger, in response to receiving an inheritance message transmitted by the user device, an inheritance mechanism to transmit the sensing data of the electronic equipment that is stored to another electronic equipment.

\* \* \* \* \*